March 16, 1954 W. J. FREEMAN 2,672,235
GRAIN CLEANER

Filed Jan. 23, 1952 2 Sheets-Sheet 1

William James Freeman
Inventor.

March 16, 1954 W. J. FREEMAN 2,672,235
GRAIN CLEANER
Filed Jan. 23, 1952 2 Sheets-Sheet 2

William James Freeman
Inventor.

Patented Mar. 16, 1954

2,672,235

UNITED STATES PATENT OFFICE 2,672,235

GRAIN CLEANER

William James Freeman, Calgary, Alberta, Canada

Application January 23, 1952, Serial No. 267,792

1 Claim. (Cl. 209—95)

This invention relates to a grain cleaner which will be compact and efficient and will separate seed grains from other objectionable matter with which they may have become mixed.

The device also cleans the grain in stages so that some portions of the separated matter may be used for feed.

My device is illustrated in the accompanying drawings in which—

Referring more particularly to the drawings in which similar characters refer to similar parts throughout the several views.

Figure 1:
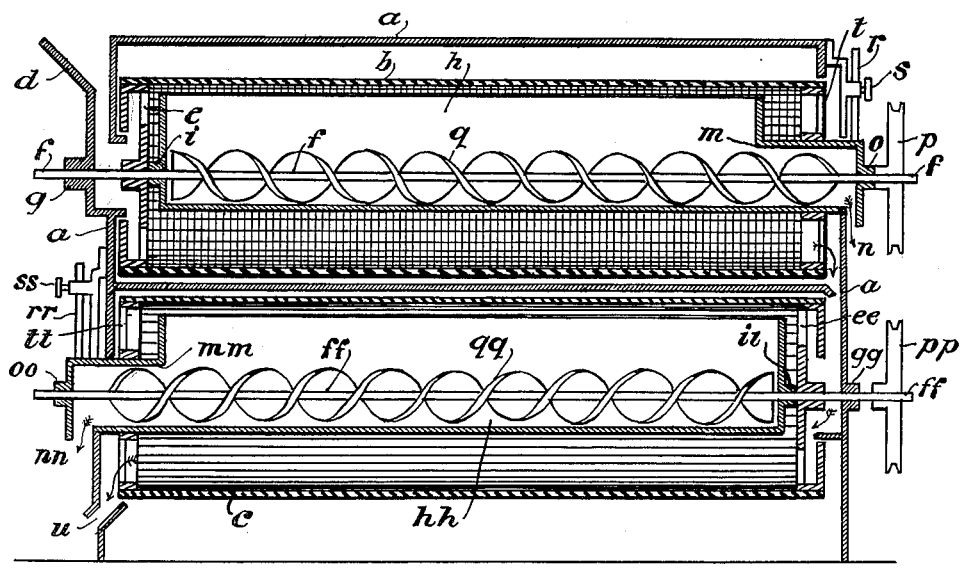
Fig. 1 is a vertical section showing the supporting frame, the drive pulleys, the cylindrical separating members, the troughs for catching the waste and objectionable materials, and the travel of the grain during the cleaning process.
Figure 2:
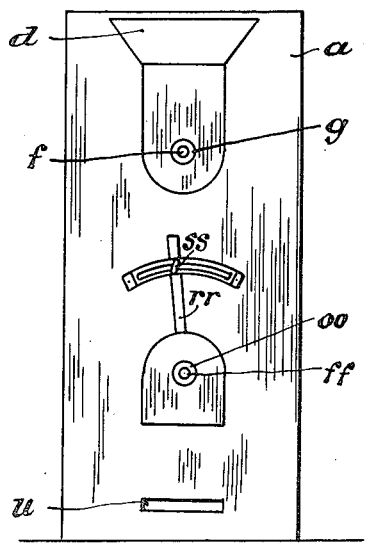
Fig. 2 is an end elevation showing the feed hopper, the adjustment for the troughs which catch the waste and objectionable materials and the point of delivery of the seed grain.
Figure 3:
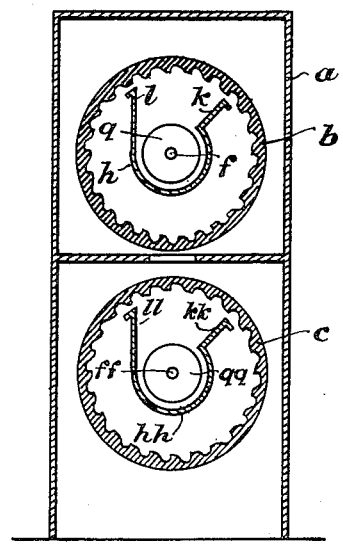
Fig. 3 is a vertical cross section showing the cylindrical members with the troughs mounted therein.

The device consists of a rectangular frame, or housing $a$, wherein are mounted cylindrical members $b$, and $c$.

On one end of the frame or housing $a$, and near the top thereof, an inlet chute is formed, and down this chute $d$, the grain mixture passes into the end of the cylinder $b$. The inlet end of the cylinder $b$ is hollow and has ports $e$ at intervals through which the mixture is admitted to the centre of the cylinder. This inlet end is secured upon a shaft $f$, which shaft rotates in a bearing $g$, mounted upon the frame member $a$, and during this rotation the cylinder $b$, is also rotated. A trough $h$ is mounted upon the shaft $f$, within the cylinder $b$, and this trough has a circular base with one side tangential thereto as shown at $l$, and the other side radial as shown at $k$. The end of this trough adjacent to the inlet of the cylinder $b$ is sealed and provided with a bearing $i$, through which the shaft $f$ passes and in which the said shaft rotates. The outlet end of the trough $h$ is made circular as shown at $m$, forming a tube through which undesirable matter is emitted from the machine as shown at $n$. The periphery of the tube $m$ forms a bearing for the ported outlet end $t$ of the cylinder $b$. The outlet end of the tube $m$ is sealed and is fitted with a bearing $o$, through which the shaft $f$ passes and in which bearing the said shaft rotates. A pulley mounted upon the shaft providing the point at which the power for rotation of the cylinder $b$ may be applied. An auger $q$ is secured upon the shaft $f$, within the trough $h$, which auger is rotated within the said trough by the shaft $f$, by the application of power to the pulley $p$, mounted outside the frame of the machine upon the shaft $f$. The adjustment of the trough within the cylinder is made by means of an arm $r$, securely attached to the tubular portion $m$, and the provision of a clamp $s$.

Residue left in the cylinder $b$, passes through the ports $t$, in the outlet end of the cylinder $b$ and is conducted to the ported inlet end of the lower cylinder $c$, as shown by the arrows and in this lower cylinder a similar action takes place to that in cylinder $b$.

The mounting of the cylinder $c$ is similar to that of the cylinder $b$, but the direction of the grain travel is reversed.

Cylinder $c$ is driven by a pulley $pp$, keyed upon a central shaft $ff$, which extends right through the cylinder $c$, and is provided with a bearing $gg$, at one end and a bearing $oo$, at its other end. The bearing $gg$, is mounted in the frame $a$, and the bearing $oo$, is mounted in the closed cylindrical end of the trough $hh$.

The trough $hh$ is similar to the trough $h$, and has a tangential side $ll$, and a radial side $kk$, extending from the circular base portion. An auger $qq$ assists the travel of the separated matter collected in the trough $hh$, to the outlet port $nn$, and the residue left in the cylinder $c$, which is clean grain passes through the ported end $tt$ of the cylinder and is collected at the exit point $u$.

Figure 4:
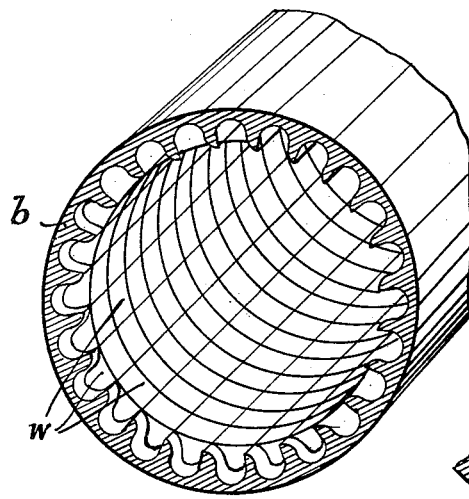
Fig. 4 is a perspective view showing how the interior of the top cylinder is surfaced to pick up the waste matter from the seed grain.
Figure 5:
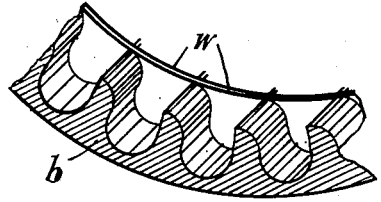
Fig. 5 is an enlarged detail of a fragment of the cylinder shown in Fig. 4.
Figure 6:
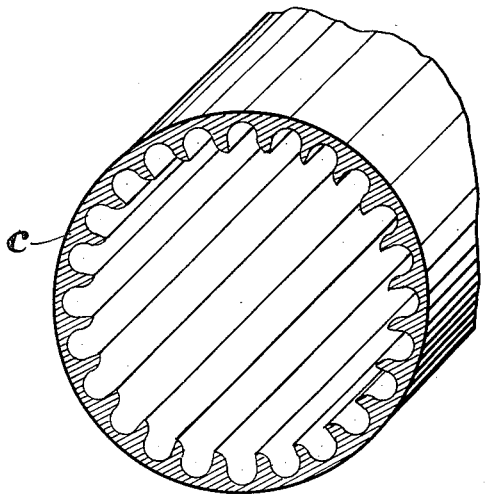
Fig. 6 is a perspective view showing how the interior surface of the lower cylinder is formed.

The inner surfaces of the cylinders $b$, and $c$ are corrugated as shown in detail in Figs. 4, 5, and 6. The corrugations in both cylinders have a radial side and a reverse curve side, the reverse curve side extending from the radial side at the bottom of each of the said corrugations to the top of the radial side of the next adjacent corrugation in a clockwise direction.

The corrugations in cylinder $b$ also have transverse partitions $w$, to divide each of the corrugations into pockets, while the corrugations in the cylinder $c$, are continuous from end to end of the cylinder.

The action of the machine is as follows:

Grain mixed with objectionable matter is delivered through the chute $d$, to the interior of the cylinder $b$, where, by the rotation of the cylinder, the small and objectionable seeds are lifted by contacting the radial surfaces of the pockets and dropped into the trough $h$. The matter dropped into trough $h$ passes out of the machine through the opening $n$, while the residue in the cylinder $b$ is directed to the interior of the lower cylinder $c$. In this cylinder a second separation takes place, the seed grain remaining in the cylinder $c$, being conducted to the outlet of the machine $u$, and the second grade material being conveyed by the trough $hh$, to the outlet point $nn$.

What I claim is—

The combination of a grain cleaner, a frame, two spaced hollow horizontal cylinders mounted in frame one above the other, means for rotating the cylinders, one of the cylinders having longitudinal corrugations on its inner surface and transverse partitions dividing each of the corrugations into pockets, the other cylinder having longitudinal corrugations on its inner surface, adjustable stationary trough means centrally located in each cylinder to receive material carried up by the pockets and corrugations and dropped into the respective troughs, means for feeding grain to be cleaned to the interior of upper cylinder, means for discharging partly cleaned grain to the interior of the lower cylinder, means connected to each trough to discharge waste and means to discharge cleaned grain from the lower cylinder.

WILLIAM JAMES FREEMAN.

References Cited in the file of this patent

UNITED STATES PATENTS

| Number | Name | Date |
|---|---|---|
| 1,625,088 | Mjolsness | Apr. 19, 1927 |
| 1,931,074 | Johnson | Oct. 17, 1933 |
| 1,932,777 | Germer | Oct. 31, 1933 |
| 2,182,638 | Mjolsness | Dec. 5, 1939 |